(12) United States Patent
Kraynev et al.

(10) Patent No.: US 8,360,924 B2
(45) Date of Patent: *Jan. 29, 2013

(54) MULTI-SPEED PLANETARY TRANSMISSION WITH TWO PLANETARY GEAR SETS AND UP TO TEN FORWARD SPEED RATIOS

(75) Inventors: Alexander Filippovich Kraynev, Moscow (RU); Vladimir Konstantinovich Astashev, Moscow (RU); Konstantin Borisovich Salamandra, Moscow (RU); Madhusudan Raghavan, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 163 days.

This patent is subject to a terminal disclaimer.

(21) Appl. No.: 12/954,937

(22) Filed: Nov. 29, 2010

(65) Prior Publication Data
US 2011/0207575 A1 Aug. 25, 2011

(30) Foreign Application Priority Data
Feb. 25, 2010 (RU) ................................ 2010107090

(51) Int. Cl.
*F16H 3/62* (2006.01)
(52) U.S. Cl. .......................... 475/277; 475/311
(58) Field of Classification Search ........... 475/269–330
See application file for complete search history.

(56) References Cited

U.S. PATENT DOCUMENTS
4,070,927 A 1/1978 Polak
4,709,594 A 12/1987 Maeda
(Continued)

FOREIGN PATENT DOCUMENTS
JP 09-126283 A 5/1997
RU 2290551 C1 12/2006
(Continued)

OTHER PUBLICATIONS

Masami Kondo, Yoshio Hasegawa, Yoji Takanami, Kenji Arai, Masaharu Tanaka, Masafumi Kinoshita, Takeshi Ootsuki, Tetsuya Yamaguchi, Akira Fukatsu, "Toyota AA80E 8-Speed Automatic Transmission with Novel Powertrain Control System", SAE Technical Paper Series, Apr. 16-19, 2007, 2007-01-1311, Warrendale, PA 15096-0001 USA.

(Continued)

*Primary Examiner* — Justin Holmes
(74) *Attorney, Agent, or Firm* — Quinn Law Group, PLLC

(57) ABSTRACT

A multi-speed transmission includes an input member, an output member, a stationary member, and a first and a second compound planetary gear set. The first planetary gear set has a first, second, third, fourth, and fifth member. The second planetary gear set has a first, second, third, and fourth member. The first member of the first compound planetary gear set is continuously connected for common rotation with the input member. The first member of the second compound planetary gear set is continuously connected for common rotation with the output member. The second member of the second compound planetary gear set is continuously grounded to the stationary member. None of the members of the first planetary gear set are continuously connected for common rotation with any of the members of the second planetary gear set. Seven torque-transmitting mechanisms are engagable to establish up to ten forward speed ratios.

17 Claims, 1 Drawing Sheet

U.S. PATENT DOCUMENTS

| | | | |
|---|---|---|---|
| 4,802,385 | A | 2/1989 | Hiraiwa |
| 5,106,352 | A | 4/1992 | Lepelletier |
| 5,385,064 | A | 1/1995 | Reece |
| 5,497,867 | A | 3/1996 | Hirsch et al. |
| 5,560,461 | A | 10/1996 | Loeffler |
| 5,599,251 | A | 2/1997 | Beim et al. |
| 5,641,045 | A | 6/1997 | Ogawa et al. |
| 5,651,435 | A | 7/1997 | Perosky et al. |
| 5,975,263 | A | 11/1999 | Forsyth |
| 6,053,839 | A | 4/2000 | Baldwin et al. |
| 6,071,208 | A | 6/2000 | Koivunen |
| 6,083,135 | A | 7/2000 | Baldwin et al. |
| 6,217,474 | B1 | 4/2001 | Ross et al. |
| 6,354,416 | B1 | 3/2002 | Eo |
| 6,375,592 | B1 | 4/2002 | Takahashi et al. |
| 6,422,969 | B1 | 7/2002 | Raghavan et al. |
| 6,425,841 | B1 | 7/2002 | Haka |
| 6,471,615 | B1 | 10/2002 | Naraki et al. |
| 6,558,287 | B2 | 5/2003 | Hayabuchi et al. |
| 6,623,397 | B1 | 9/2003 | Raghavan et al. |
| 6,840,885 | B2 | 1/2005 | Yi et al. |
| 2006/0014603 | A1 | 1/2006 | Raghavan et al. |
| 2008/0274853 | A1 | 11/2008 | Raghavan |
| 2011/0207573 | A1* | 8/2011 | Kraynev et al. ............... 475/292 |

FOREIGN PATENT DOCUMENTS

| | | |
|---|---|---|
| RU | 2348542 C1 | 3/2009 |
| SU | 968545 A2 | 10/1982 |
| SU | 1293419 A1 | 2/1987 |
| WO | 03025431 A1 | 3/2003 |
| WO | 2006032312 A1 | 3/2006 |
| WO | 2006074707 A1 | 7/2006 |

OTHER PUBLICATIONS

Hirofumi Ota, Kazutoshi, Nozaki, Atsushi Honda, Masafumi Kinoshita, Toshihiko Aoki, Minoru Todo, Mikio Iwase, "Toyota's World First 8-Speed Automatic Transmission for Passenger Cars", SAE Technical Paper Series, Apr. 16-19, 2007, 2007-01-1101, Warrendale, PA 15096-0001 USA.

* cited by examiner

| Gear State | Speed Ratio | Ratio Step | C1 | C2 | C3 | C4 | C5 | C6 | C7 |
|---|---|---|---|---|---|---|---|---|---|
| REV | -3.0 | | | | | | | | x |
| 1st | 3.0 | | | | x | x | | x | |
| 2nd | 2.6 | 1.15 | x | | | x | | x | |
| 3rd | 2.37 | 1.10 | x | | x | | | x | |
| 4th | 1.98 | 1.20 | | x | | x | | x | |
| 5th | 1.59 | 1.25 | | x | x | | | x | |
| 6th | 1.0 | 1.59 | | | x | x | x | | |
| 7th | 0.87 | 1.15 | x | | | x | x | | |
| 8th | 0.79 | 1.10 | x | | x | | x | | |
| 9th | 0.65 | 1.22 | | x | | x | x | | |
| 10th | 0.53 | 1.27 | | x | x | | x | | | x = Engaged State

MULTI-SPEED PLANETARY TRANSMISSION WITH TWO PLANETARY GEAR SETS AND UP TO TEN FORWARD SPEED RATIOS

CROSS-REFERENCE TO RELATED APPLICATION

This application claims the benefit of Russian Patent Application No. 2010107090, filed Feb. 25, 2010, which is hereby incorporated by reference in its entirety.

TECHNICAL FIELD

The invention relates to a multi-speed planetary transmission with seven torque-transmitting mechanisms and two compound planetary gear sets

BACKGROUND OF THE INVENTION

Automotive vehicles include a powertrain that is comprised of an engine, a multi-speed transmission, and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmissions had two speed ranges. This severely limited the overall speed range of the vehicle and therefore required a relatively large engine that could produce a wide speed and torque range. This resulted in the engine operating at a specific fuel consumption point during cruising other than the most efficient point. Therefore, manually-shifted (countershaft transmissions) were the most popular.

With the advent of three- and four-speed automatic transmissions, the automatic shifting (planetary gear) transmission increased in popularity with the motoring public. These transmissions improved the operating performance and fuel economy of the vehicle. The increased number of speed ratios reduces the step size between ratios and therefore improved the shift quality of the transmission by making the ratio interchanges substantially imperceptible to the operator under normal vehicle acceleration.

Multi-speed transmissions with greater than four speed ratios provide further improvements in acceleration and fuel economy over three- and four-speed transmissions. However, typical increased complexity, size and cost of such transmissions are competing factors which may prevent their use in some applications.

SUMMARY OF THE INVENTION

A multi-speed transmission is provided that can operate at up to ten forward speed ratios with relatively low content and in a relatively compact layout, especially in comparison to a layshaft design providing the same number of forward speed ratios. The transmission includes an input member, an output member, and a stationary member. The transmission further includes a first and a second compound planetary gear set. The first planetary gear set has a first, a second, a third, a fourth, and a fifth member. The second planetary gear set has a first, a second, a third, and a fourth member. In referring to the members of the planetary gear sets in this manner, the members may be counted "first" to "fourth" or "first" to "fifth" in any order (i.e., top to bottom, bottom to top, etc.) The members of the planetary gear sets are sun gear members, ring gear members and carrier members.

The first member of the first compound planetary gear set is continuously connected for common rotation with the input member. The first member of the second compound planetary gear set is continuously connected for common rotation with the output member. The second member of the second compound planetary gear set is continuously grounded to the stationary member. None of the members of the first planetary gear set are continuously connected for common rotation with any of the members of the second planetary gear set. As used herein, "common rotation" means rotation at the same speed (i.e., no relative rotation).

The transmission includes seven torque-transmitting mechanisms that are selectively engagable to interconnect respective ones of the members of the first compound planetary gear set with the input member, the stationary member or respective members of the second compound planetary gear set. The seven torque-transmitting mechanisms are engagable in different combinations to establish up to ten forward speed ratios and a reverse speed ratio between the input member and the output member.

The second and third members of the first compound planetary gear set are selectively grounded to the stationary member via engagement of a first and a second of the seven torque-transmitting mechanisms, respectively. The fourth member of the first compound planetary gear set is selectively connectable for common rotation with the first member of the second compound planetary gear set via engagement of a third and a fifth of the seven torque-transmitting mechanisms. The fourth member of the first compound planetary gear set is selectively connectable for common rotation with the third member of the second compound planetary gear set via engagement of the third and a sixth of the seven torque-transmitting mechanisms. The fifth member of the first compound planetary gear set is selectively connectable for common rotation with the first member of the second compound planetary gear set via engagement of a fourth and the fifth of the seven torque-transmitting mechanisms. The fifth member of the first compound planetary gear set is selectively connectable for common rotation with the third member of the second compound planetary gear set via engagement of the fourth and the sixth of the seven torque-transmitting mechanisms. A seventh of the seven torque-transmitting mechanisms is selectively engagable to connect the input member for common rotation with the fourth member of the second compound planetary gear set. Shifts between at least some of the forward speed ratios are single-transition shifts.

The first and the second torque-transmitting mechanisms may be located axially adjacent one another with none of the planetary gear set members and none of the other torque-transmitting mechanisms therebetween. This minimizes transmission complexity and simplifies hydraulic feed to the torque-transmitting mechanisms, potentially reducing required pump capacity. Moreover, the third, the fourth, the fifth, the sixth, and the seventh torque-transmitting mechanisms may be located axially adjacent one another with none of the planetary gear set members and none of the other torque-transmitting mechanisms therebetween.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figures 1, 2:
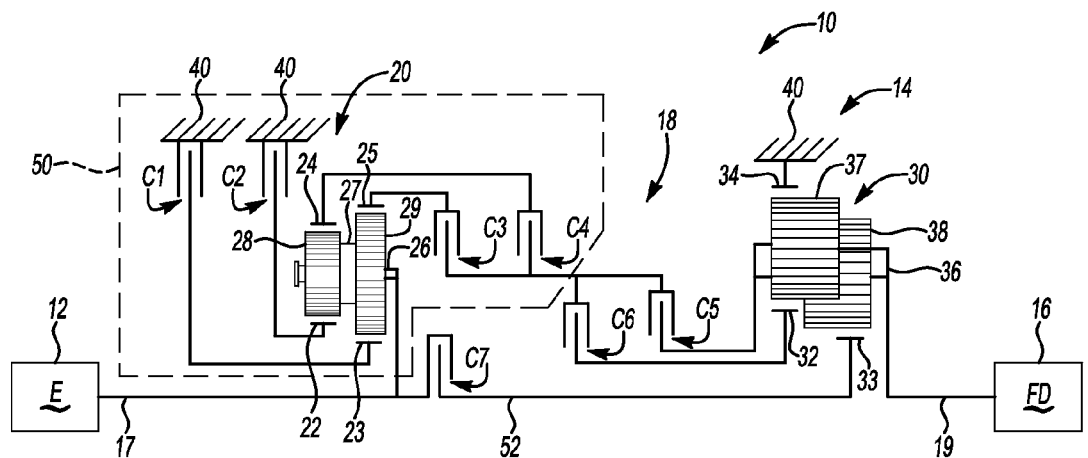
FIG. 1 is a schematic illustration in stick diagram form of a powertrain having a multi-speed planetary transmission.
FIG. 2 is a truth table depicting some of operating characteristics of the transmission shown in FIG. 1.

Referring to the drawings, wherein like reference numbers refer to like components, FIG. 1 shows the powertrain 10 with an engine 12 (labeled E), planetary transmission 14, and a final drive mechanism 16 (labeled FD). The engine 12 may be powered by various types of fuel to improve the efficiency and fuel economy of a particular application. Such fuels may include, for example gasoline, diesel, an ethanol, dimethyl ether, etc. The planetary transmission 14 includes an input member 17 continuously connected with an output member of the engine 12, such as a crankshaft, optionally through a torque converter. The planetary transmission 14 further includes a planetary gear arrangement 18, and an output member 19 continuously connected with the final drive mechanism 16 for providing propulsion power to vehicle wheels.

The planetary gear arrangement 18 includes two compound planetary gear sets: a first compound planetary gear set 20, and a second compound planetary gear set 30. The compound planetary gear set 20 include two sun gear members 22, 23, two ring gear members 24, 25, and a carrier member 26 that rotatably supports a stepped pinion gear 27. The stepped pinion gear 27 has a small diameter portion 28 and a large diameter portion 29. The small diameter portion 28 meshes with sun gear member 22 and ring gear member 24. The large diameter portion 29 meshes with sun gear member 23 and ring gear member 25. The carrier member 26 is referred to as a first member of the first compound planetary gear set 20, the sun gear member 23 is referred to as the second member of the first compound planetary gear set 20. The sun gear member 22 is referred to as the third member of the first compound planetary gear set 20. The ring gear members 25 and 24 are referred to as the fourth and fifth members of the compound planetary gear set 20, respectively.

The compound planetary gear set 30 includes two sun gear members 32, 33, one ring gear member 34, and a carrier member 36 that rotatably supports first and second sets of pinion gears 37, 38. The first set of pinion gears 37 meshes with sun gear member 32, with ring gear member 34, as well as with the second set of pinion gears 38. Pinion gears 38 also mesh with sun gear member 33. Ring gear member 34 is continuously grounded to a stationary member 40, such as a transmission casing. Compound planetary gear set 30 is commonly referred to as a Ravigneaux planetary gear set. The carrier member 36 is referred to as a first member of the compound planetary gear set 30. The ring gear member 34 is referred to as a second member of the compound planetary gear set 30. The sun gear member 32 is referred to as the third member of the compound planetary gear set 30. The sun gear member 33 is referred to as the fourth member of the compound planetary gear set 30.

The transmission 14 further includes seven torque-transmitting mechanisms: a first torque-transmitting mechanism C1, a second torque-transmitting mechanism C2, a third torque-transmitting mechanism C3, a fourth torque-transmitting mechanism C4, a fifth torque-transmitting mechanism C5, a sixth torque-transmitting mechanism C6, and a seventh torque-transmitting mechanism C7. Torque-transmitting mechanisms C1 and C2 are stationary-type clutches, also referred to as brakes. Torque-transmitting mechanisms C3, C4, C5, C6, and C7, are rotating-type clutches. In other embodiments, various ones of the torque-transmitting mechanisms may be friction clutches, synchronizers, band clutches, selectable one-way clutches, dog clutches and other possible types of torque-transmitting mechanisms. Only a portion of the transmission 14 above the axis of rotation established by the input member 17 is shown in FIG. 1. The planetary gear sets 20, 30 and torque-transmitting mechanisms C1, C2, C3, C4, C5, C6 and C7 are substantially symmetrical at a portion below the input member 17, not shown.

As is apparent from FIG. 1, the input member 17 is continuously connected for common rotation with the carrier member 26. The output member 19 is continuously connected for common rotation with carrier member 36. None of the gear members of the compound planetary gear set 20 are continuously connected for common rotation with any of the gear members of the compound planetary gear set 30.

The first torque-transmitting mechanism C1, also referred to as brake C1, is selectively engagable to ground the sun gear member 23 to the stationary member 40. The second torque-transmitting mechanism C2, also referred to as brake C2, is selectively engagable to ground the sun gear member 22 to the stationary member 40. The third torque-transmitting mechanism C3, also referred to as clutch C3, is selectively engagable to connect the ring gear member 25 for common rotation with the carrier member 36 when the fifth torque-transmitting mechanism, clutch C5, is selectively engaged, or with the sun gear member 32 when the sixth torque-transmitting mechanism, clutch C6, is selectively engaged. The fourth torque-transmitting mechanism C4, also referred to as clutch C4, is selectively engagable to connect ring gear member 24 for common rotation with the carrier member 36 when clutch C5 is engaged, or with the sun gear member 32 when clutch C6 is engaged. The seventh torque-transmitting mechanism C7, also referred to as clutch C7, is selectively engagable to connect the input member 17 for common rotation with the sun gear member 33.

As shown in the truth table of FIG. 2, the torque-transmitting mechanisms are selectively engagable in combinations of three (listed as gear states) to provide ten forward speed ratios and a reverse speed ratio. Corresponding numerical gear ratios set forth in FIG. 2 result from tooth counts establishing the following gear ratios for the first compound planetary gear set 20: the gear ratio of the ring gear member 24 to the sun gear member 22 is −1.83 assuming the carrier member 26 is stopped (for purposes of calculation only); the gear ratio of the ring gear member 25 to the sun gear member 23 is −3.87 assuming the carrier member 26 is stopped (for purposes of calculation only). The tooth counts for the second planetary gear set 30 are selected so that the gear ratio of the ring gear member 34 to the sun gear member 32 is −2.0 and the gear ratio of the ring gear member 34 to the sun gear member 33 is 4.0, in both cases assuming the carrier member 36 is stopped (for purposes of calculation only).

Thus, there are five underdrive speed ratios (1st to 5th), a direct drive (6th) and four overdrive speed ratios (7th to 10th). With the tooth counts listed above, the ratio steps listed in FIG. 2 are achieved. As is apparent in FIG. 2, the ratio steps are very even in the forward speed ratios, resulting in smooth shift feel and increased fuel efficiency as the engine 12 need only operate over a narrow range of speeds in each speed ratio.

Other gear tooth counts and corresponding gear ratios may be selected to accomplish speed ratios and ratio steps advantageous to the particular transmission application. A person of ordinary skill in the art of transmission design would understand how to select desirable tooth counts.

To establish the reverse speed ratio, clutch C7 is engaged. Torque is carried from the input member 17 to intermediate shaft 52 and sun gear member 33 and through second compound planetary gear set 30 to the output member 19. The output member 19 rotates in an opposite direction from the input member 17.

To establish the first speed ratio, clutches C3, C4 and C6 are engaged. Torque is carried from the input member 17 through ring gear members 24, 25, to sun gear member 32 and through compound planetary gear set 30 to output member 19. Input member 17 and output member 19 rotate in the same direction, as in all of the forward speed ratios. In the reverse speed ratio and in the first forward speed ratio, neither brake C1 nor brake C2 is engaged, so the first compound planetary gear set 20 is inactive (i.e., does not affect the numerical speed ratio between the input member 17 and the output member 19).

In a second forward speed ratio, clutches C1, C4 and C6 are engaged. Torque is carried from the input member 17 through the first compound planetary gear set 20 at ring gear 24, to the sun gear member 32 and through compound planetary gear set 30 to output member 19. The shift from the first forward speed ratio to the second forward speed ratio is a single-transition shift, in that only one different torque-transmitting mechanism is engaged in the second forward speed ratio than in the first forward speed ratio.

In a third forward speed ratio, clutches C1, C3 and C6 are engaged. Torque is carried from the input member 17 through the first compound planetary gear set 20 at ring gear 25, to the sun gear member 32 and through compound planetary gear set 30 to output member 19. The shift from the second forward speed ratio to the third forward speed ratio is a single-transition shift, in that only one different torque-transmitting mechanism is engaged in the third forward speed ratio than in the second forward speed ratio.

In a fourth forward speed ratio brake C2 and clutches C4 and C6 are engaged. Torque is carried from the input member 17 through the first compound planetary gear set 20 at ring gear 24, to the sun gear member 32 and through compound planetary gear set 30 to output member 19. The shift from the third forward speed ratio to the fourth forward speed ratio is a double-transition shift.

In a fifth forward speed ratio brake C2 and clutches C3 and C6 are engaged. Torque is carried from the input member 17 through the first compound planetary gear set 20 at ring gear 25, to the sun gear member 32 and through compound planetary gear set 30 to output member 19. The shift from the fourth forward speed ratio to the fifth forward speed ratio is a single-transition shift.

In a sixth forward speed ratio clutches C3, C4 and C5 are engaged. Torque is carried from the input member 17 through the first compound planetary gear set 20 at ring gear members 24 and 25, to the carrier member 36 which rotates commonly with the output member 19. Because neither brake C1 nor brake C2 is engaged, the first compound planetary gear set 20 is inactive, and the sixth forward speed ratio is a direct drive ratio. The shift from the fifth forward speed ratio to the sixth forward speed ratio is a double-transition shift.

In a seventh forward speed ratio, brake C1 and clutches C4 and C5 are engaged. Torque is carried from the input member 17 to the ring gear member 24 through the first compound planetary gear set 20, to the carrier member 36 which rotates commonly with the output member 19. The shift from the sixth forward speed ratio to the seventh forward speed ratio is a single-transition shift.

In an eighth forward speed ratio, brake C1 and clutches C3 and C5 are engaged. Torque is carried from the input member 17 to the ring gear member 25 through the first compound planetary gear set 20, to the carrier member 36 which rotates commonly with the output member 19. The shift from the seventh forward speed ratio to the eighth forward speed ratio is a single-transition shift.

In a ninth forward speed ratio, brake C2 and clutches C4 and C5 are engaged. Torque is carried from the input member 17 to the ring gear member 24 through the first compound planetary gear set 20, to the carrier member 36 which rotates commonly with the output member 19. The shift from the eighth forward speed ratio to the ninth forward speed ratio is a double-transition shift.

In a tenth forward speed ratio, brake C2 and clutches C3 and C5 are engaged. Torque is carried from the input member 17 to the ring gear member 25 through the first compound planetary gear set 20, to the carrier member 36 which rotates commonly with the output member 19. The shift from the ninth forward speed ratio to the tenth forward speed ratio is a single-transition shift.

Although ten forward speed ratios are available, the transmission 14 may be controlled to operate as a five-speed transmission, a six-speed transmission, a seven-speed transmission, an eight-speed transmission, a nine-speed transmission, or a ten-speed transmission. For example, to operate the transmission 14 as a five-speed transmission, an algorithm stored in a controller that controls the valves to control hydraulic fluid flow to the torque-transmitting mechanisms may establish only the reverse speed ratio, and the first, second, third, fifth, and tenth forward speed ratios described above as first, second, third, fourth, and fifth forward speed ratios. In such a five-speed transmission, there would be no double-transition shifts.

To operate the transmission 14 as a six-speed transmission, the five forward speed ratios described for the five-speed transmission would be utilized, as well as any one of the sixth, seventh, and eighth forward speed ratios of FIG. 2. The six-speed transmission would either have no double-transition shifts (if either the seventh or eighth forward speed ratios of FIG. 2 were utilized, or only one double-transition shift (if the sixth forward speed ratio of FIG. 2 were utilized)).

To operate the transmission 14 as a seven-speed transmission, the five forward speed ratios described for the five-speed transmission would be utilized, as well as any two of the sixth, seventh, and eighth forward speed ratios of FIG. 2. The sixth-speed transmission would have only one double-transition shift (from the fifth to the sixth forward speed ratio of FIG. 2, which would be the fourth to the fifth forward speed ratio of the seven-speed transmission).

To operate the transmission 14 as an eight-speed transmission, the five forward speed ratios described for the five-speed transmission would be utilized, as well as the sixth, seventh, and eighth forward speed ratios of FIG. 2. Thus, the eight-speed transmission would have all of the forward speed ratios of FIG. 2 except for the fourth and the ninth forward speed ratios. The eight-speed transmission would have only one double-transition shift (from the fifth to the sixth forward speed ratio of FIG. 2, which would also be the fifth to the sixth forward speed ratio of the eight-speed transmission).

To operate the transmission 14 as a nine-speed transmission, all of the forward speed ratios of FIG. 2 would be utilized except for the tenth forward speed ratio. The nine-speed transmission would have two double-transition shifts (from the third to the fourth forward speed ratios of FIG. 2, which would also be the third to the fourth forward speed ratios of the nine-speed transmission, and from the fifth to the sixth forward speed ratios of FIG. 2, which would also be the fifth to the sixth forward speed ratios of the nine-speed transmission). The transmission 14 could also be operated with less than six forward speed ratios.

Referring to FIG. 2, it is apparent that clutch C7 is engaged only in the reverse speed ratio. The position of clutch C7 between the input member 17 and intermediate shaft 52, which is coaxial with input member 17, allows the use of a dog clutch or a selectable one-way clutch for clutch C7.

It is evident in FIG. 1 that brakes C1 and C2 are located axially adjacent one another with no other clutches or brakes and no members of the planetary gear sets 20, 30 between the brakes C1, C2. Locating brakes C1 and C2 adjacent one another in this manner enables hydraulic fluid flow to the brakes C1 and C2 to be through mostly common feed channels. Simplifying the hydraulic feed channels and reducing the overall length of the feed channels simplifies production of the transmission 14 and may enable a smaller pump for the hydraulic system. Likewise, rotating-type clutches C3, C4, C5, C6 and C7 are located axially-adjacent one another with no other torque-transmitting mechanisms or planetary gear set members therebetween. Location of the brakes C1, C2 and the clutches C3, C4, C5, C6, and C7, in this manner further simplifies production of feed channels and may reduce required pump size.

The compound planetary gear set 20, brakes C1 and C2, and clutches C3 and C4 may be referred to as a compact gearbox 50, bounded in phantom in FIG. 1, as the gearbox 50 contains the components necessary to establish the ten forward speed ratios, with the remaining clutches C5, C6 and C7 being engaged to establish the direct drive and underdrive gears (C5 being engaged), the underdrive gears (C6 being engaged). That is, engagement of torque-transmitting mechanisms within the gearbox 50 is varied to switch between the underdrive speed ratios while clutch C6 remains engaged, and engagement of torque-transmitting mechanisms within the gearbox 50 is varied to switch between the direct drive ratio and the overdrive ratios, or between the overdrive ratios, while clutch C5 remains engaged in the underdrive speed ratios, the gear member with the highest torque load is ring gear member 34.

The powertrain 10 may share components with a hybrid vehicle, and such a combination may be operable in a "charge-depleting mode". For purposes of the present invention, a "charge-depleting mode" is a mode wherein the vehicle is powered primarily by an electric motor/generator such that a battery is depleted or nearly depleted when the vehicle reaches its destination. In other words, during the charge-depleting mode, the engine 12 is only operated to the extent necessary to ensure that the battery is not depleted before the destination is reached. A conventional hybrid vehicle operates in a "charge-sustaining mode", wherein if the battery charge level drops below a predetermined level (e.g., 25%) the engine is automatically run to recharge the battery. Therefore, by operating in a charge-depleting mode, the hybrid vehicle can conserve some or all of the fuel that would otherwise be expended to maintain the 25% battery charge level in a conventional hybrid vehicle. It should be appreciated that a hybrid vehicle powertrain is preferably only operated in the charge-depleting mode if the battery can be recharged after the destination is reached by plugging it into an energy source.

While the best modes for carrying out the invention have been described in detail, those familiar with the art to which this invention relates will recognize various alternative designs and embodiments for practicing the invention within the scope of the appended claims.

The invention claimed is:

1. A multi-speed transmission comprising:
   an input member;
   an output member;
   a stationary member;
   a first and a second compound planetary gear set; wherein the first planetary gear set has a first, a second, a third, a fourth, and a fifth member; wherein the second planetary gear set has a first, a second, a third, and a fourth member; wherein the members of the planetary gear sets are sun gear members, ring gear members and carrier members; wherein the first member of the first compound planetary gear set is continuously connected for common rotation with the input member; wherein the first member of the second compound planetary gear set is continuously connected for common rotation with the output member; wherein the second member of the second compound planetary gear set is continuously grounded to the stationary member; wherein none of the members of the first planetary gear set are continuously connected for common rotation with any of the members of the second planetary gear set; and
   seven torque-transmitting mechanisms selectively engagable to interconnect a respective one of the members of the first compound planetary gear set with the input member, the stationary member or a respective member of the second compound planetary gear set, the seven torque-transmitting mechanisms being engagable in different combinations to establish up to ten forward speed ratios and a reverse speed ratio between the input member and the output member.

2. The multi-speed transmission of claim 1, wherein the second and third members of the first compound planetary gear set are selectively grounded to the stationary member via engagement of a first and a second of the seven torque-transmitting mechanisms, respectively.

3. The multi-speed transmission of claim 2, wherein the first and the second torque-transmitting mechanisms are located axially adjacent one another with none of the planetary gear set members and no other of the seven torque-transmitting mechanisms therebetween.

4. The multi-speed transmission of claim 1, wherein the fourth member of the first compound planetary gear set is selectively connectable for common rotation with the first member of the second compound planetary gear set via engagement of a third and a fifth of the seven torque-transmitting mechanisms.

5. The multi-speed transmission of claim 1, wherein the fourth member of the first compound planetary gear set is selectively connectable for common rotation with the third member of the second compound planetary gear set via engagement of a third and a sixth of the seven torque-transmitting mechanisms.

6. The multi-speed transmission of claim 1, wherein the fifth member of the first compound planetary gear set is selectively connectable for common rotation with the first member of the second compound planetary gear set via engagement of a fourth and a fifth of the seven torque-transmitting mechanisms.

7. The multi-speed transmission of claim 1, wherein the fifth member of the first compound planetary gear set is selectively connectable for common rotation with the third member of the second compound planetary gear set via engagement of a fourth and a sixth of the seven torque-transmitting mechanisms.

8. The multi-speed transmission of claim 1, wherein a seventh of the seven torque-transmitting mechanisms is selectively engagable to connect the input member for common rotation with the fourth member of the second compound planetary gear set.

9. The multi-speed transmission of claim 8, wherein the seventh torque-transmitting mechanism is engaged only in the reverse speed ratio and is one of a dog clutch and a selectable one-way clutch.

10. The multi-speed transmission of claim 1, wherein shifts between at least some of the forward speed ratios are single-transition shifts.

11. The multi-speed transmission of claim 1, wherein a third, a fourth, a fifth, a sixth and a seventh of the seven torque-transmitting mechanisms are located axially adjacent one another with none of the planetary gear set members and no other of the seven torque-transmitting mechanisms therebetween.

12. The multi-speed transmission of claim 1, wherein the first, the second, the third, the fourth, and the fifth members of the first compound planetary gear set are a first carrier member, a first sun gear member, a second sun gear member, a first ring gear member and a second ring gear member, respectively; wherein the first carrier member rotatably supports a stepped pinion gear having a relatively small diameter portion that meshes with the second sun gear member and the second ring gear member, and a relatively large diameter portion that meshes with the first sun gear member and the first ring gear member;

wherein the first, the second, the third, and the fourth members of the second compound planetary gear set are a second carrier member, a third ring gear member, a third sun gear member, and a fourth sun gear member, respectively; wherein the second carrier member rotatably supports a first and a second set of pinion gears; and wherein the first set of pinion gears meshes with the third ring gear member, the third sun gear member, and the second set of pinion gears; and wherein the second set of pinion gears also meshes with the fourth sun gear member.

13. A multi-speed transmission comprising:
an input member;
an output member;
a stationary member;
a first and a second compound planetary gear set; wherein the first planetary gear set has a first, a second, a third, a fourth, and a fifth member; wherein the second planetary gear set has a first, a second, a third, and a fourth member; wherein the members of the planetary gear sets are sun gear members, ring gear members and carrier members; wherein the first member of the first compound planetary gear set is continuously connected for common rotation with the input member; wherein the first member of the second compound planetary gear set is continuously connected for common rotation with the output member; wherein the second member of the second compound planetary gear set is continuously grounded to the stationary member; wherein none of the members of the first planetary gear set are continuously connected for common rotation with any of the members of the second planetary gear set;
seven selectively engagable torque-transmitting mechanisms;
wherein the second and third members of the first compound planetary gear set are selectively grounded to the stationary member via engagement of a first and a second of the seven torque-transmitting mechanisms, respectively;
wherein the fourth member of the first compound planetary gear set is selectively connectable for common rotation with the first member of the second compound planetary gear set via engagement of a third and a fifth of the seven torque-transmitting mechanisms;
wherein the fifth member of the first compound planetary gear set is selectively connectable for common rotation with the first member of the second compound planetary gear set via engagement of a fourth and the fifth of the seven torque-transmitting mechanisms;
wherein the fifth member of the first compound planetary gear set is selectively connectable for common rotation with the third member of the second compound planetary gear set via engagement of the fourth and a sixth of the seven torque-transmitting mechanisms;
wherein a seventh of the seven torque-transmitting mechanisms is selectively engagable to connect the input member for common rotation with the fourth member of the second compound planetary gear set; and
said seven torque-transmitting mechanisms being engagable in different combinations to establish up to ten forward speed ratios and a reverse speed ratio between the input member and the output member.

14. The multi-speed transmission of claim 13, wherein shifts between at least some of the forward speed ratios are single-transition shifts.

15. The multi-speed transmission of claim 13, wherein the first and the second torque-transmitting mechanisms are located axially adjacent one another with none of the planetary gear set members and no other of the seven torque-transmitting mechanisms therebetween.

16. The multi-speed transmission of claim 13, wherein the third, the fourth, the fifth, the sixth and the seventh torque-transmitting mechanisms are located axially adjacent one another with none of the planetary gear set members and no other of the seven torque-transmitting mechanisms therebetween.

17. The multi-speed transmission of claim 13, wherein the seventh torque-transmitting mechanism is engaged only in the reverse speed ratio and is one of a dog clutch and a selectable one-way clutch.

* * * * *